(12) United States Patent
Onoda

(10) Patent No.: US 12,115,954 B2
(45) Date of Patent: Oct. 15, 2024

(54) BRAKE FLUID PRESSURE SUPPLY UNIT

(71) Applicant: ADVICS CO., LTD., Kariya (JP)

(72) Inventor: Shingo Onoda, Kariya (JP)

(73) Assignee: ADVICS CO., LTD., Kariya (JP)

( * ) Notice: Subject to any disclaimer, the term of this patent is extended or adjusted under 35 U.S.C. 154(b) by 0 days.

(21) Appl. No.: 18/043,246

(22) PCT Filed: Sep. 29, 2021

(86) PCT No.: PCT/JP2021/035851
§ 371 (c)(1),
(2) Date: Feb. 27, 2023

(87) PCT Pub. No.: WO2022/071388
PCT Pub. Date: Apr. 7, 2022

(65) Prior Publication Data
US 2023/0311829 A1    Oct. 5, 2023

(30) Foreign Application Priority Data

Sep. 29, 2020   (JP) ................................ 2020-164166

(51) Int. Cl.
*B60T 13/14*  (2006.01)
*B60T 13/74*  (2006.01)
*F15B 1/26*   (2006.01)

(52) U.S. Cl.
CPC .......... *B60T 13/148* (2013.01); *B60T 13/745* (2013.01); *F15B 1/265* (2013.01)

(58) Field of Classification Search
CPC ...... B60T 7/042; B60T 2220/04; B60T 8/171; B60T 13/148; B60T 13/745; B60T 17/00; B60T 13/66

See application file for complete search history.

(56) References Cited

U.S. PATENT DOCUMENTS 4,037,883 A * 7/1977 Fuchs ................ B60T 8/17633
                                                    303/61
10,549,737 B2 * 2/2020 Leiber .................. B60T 13/745
(Continued)

FOREIGN PATENT DOCUMENTS

DE   10 2018 219 975 A1   5/2020
JP       2017-47753 A     3/2017
JP       2018-20783 A     2/2018

OTHER PUBLICATIONS

International Search Report issued Nov. 16, 2021 in PCT/JP2021/035851 filed on Sep. 29, 2021, 2 pages.

*Primary Examiner* — Thomas E Lazo
(74) *Attorney, Agent, or Firm* — Oblon, McClelland, Maier & Neustadt, L.L.P.

(57) ABSTRACT

A brake fluid pressure supply unit includes a fluid pressure generation device in which a piston that slides in a cylinder is driven by an electric motor to generate fluid pressure in a fluid pressure chamber formed in the cylinder; and a housing in which a fluid path connected to the fluid pressure chamber is formed. The electric motor and the cylinder are both attached to the housing. The electric motor is positioned more on upper side of the brake fluid pressure supply unit than the cylinder in a vertical direction. Thus, even if fluid leaks from the cylinder, the fluid having leaked can be prevented from entering inside of the electric motor. Thus, the operation of the electric motor is not impaired, whereby the reliability of the brake fluid pressure supply unit can be improved.

1 Claim, 3 Drawing Sheets

(56) References Cited

U.S. PATENT DOCUMENTS

| | | | |
|---|---|---|---|
| 2014/0216866 A1* | 8/2014 | Feigel | B60T 17/00 |
| | | | 188/156 |
| 2015/0166030 A1* | 6/2015 | Kobayashi | B60T 13/686 |
| | | | 303/14 |
| 2015/0203087 A1* | 7/2015 | Ozsoylu | B60T 13/145 |
| | | | 188/359 |
| 2016/0059835 A1* | 3/2016 | Gilles | B60T 13/168 |
| | | | 303/3 |
| 2016/0185329 A1* | 6/2016 | Lee | B60T 8/4081 |
| | | | 303/10 |
| 2017/0282881 A1* | 10/2017 | Nakamura | B60T 11/165 |
| 2017/0341632 A1* | 11/2017 | Han | F16H 19/04 |
| 2018/0065605 A1* | 3/2018 | Leiber | B60T 13/745 |
| 2018/0265060 A1* | 9/2018 | Maruo | B60T 8/368 |
| 2019/0315322 A1* | 10/2019 | Goto | B60T 7/12 |

\* cited by examiner

BRAKE FLUID PRESSURE SUPPLY UNIT

TECHNICAL FIELD

The present disclosure relates to a brake fluid pressure supply unit.

BACKGROUND ART

Patent Literature 1 discloses an example of a conventionally known brake fluid pressure supply unit. This conventional brake fluid pressure supply unit includes an electric motor, and an electric cylinder driven by the electric motor. In the conventional brake fluid pressure supply unit, the electric cylinder is disposed inside a main body, and the electric motor is disposed outside the main body.

CITATIONS LIST

Patent Literature

Patent Literature 1: Japanese Patent Application Laid-Open No. 2018-20783

BRIEF SUMMARY

Technical Problems

With the orientation of the conventional brake fluid pressure supply unit installed in a vehicle, the electric cylinder disposed in the main body (housing) is more on the upper side in the vertical direction than the electric motor disposed outside the main body. Thus, when fluid such as brake fluid leaks from the electric cylinder, the fluid having leaked may flow along the main body and come into contact with the electric motor on the lower side in the vertical direction. As a result, the operation of the electric motor might be affected. Thus, there has been a demand for improvement in terms of reliability of the brake fluid pressure supply unit.

The present disclosure is made to solve the problem described above, and an object of the present disclosure is to provide a brake fluid pressure supply unit with improved reliability.

Solutions to Problems

A brake fluid pressure supply unit for a vehicle according to the present disclosure includes: a fluid pressure generation device in which a piston that slides in a cylinder is driven by an electric motor to generate fluid pressure in a fluid pressure chamber formed in the cylinder; and a housing in which a fluid path connected to the fluid pressure chamber is formed, wherein the electric motor and the cylinder are both attached to the housing, and with an orientation of the brake fluid pressure supply unit installed in the vehicle, the electric motor is positioned more on upper side than the cylinder in a vertical direction.

A vehicle according to the present disclosure includes the brake fluid pressure supply unit for the vehicle described above in which the electric motor and the cylinder are disposed on same side of the housing, wherein the brake fluid pressure supply unit is installed with the electric motor and the cylinder being positioned in a rear portion of the housing in a forward and rearward direction of the vehicle.

Advantageous Effects

With the orientation of the brake fluid pressure supply unit of the present disclosure installed in a vehicle, the electric motor can be attached to the housing while being more on the upper side than the cylinder in the vertical direction. Thus, even if the fluid leaks from the cylinder, the fluid having leaked can be prevented from entering the inside of the electric motor. Thus, the reliability of the brake fluid pressure supply unit can be improved.

In the vehicle of the present disclosure, in a state where the brake fluid pressure supply unit is installed in the vehicle, the electric motor and the cylinder can be positioned on the rearward side in the forward and rearward direction of the vehicle, or can be more on the rearward side than the center in the forward and backward direction of the vehicle. Thus, impact resistance of the electric motor and the cylinder can be improved against an impact from the forward side in the forward and rearward direction of the vehicle. The electric motor and the cylinder can be positioned on the rearward side (be more on the rearward side than the center) in the forward and rearward direction of the vehicle, where the number of auxiliaries and the like disposed is relatively small. Thus, the space can be effectively utilized, and a sufficient installation space can be guaranteed for other equipment, auxiliaries, and the like.

DESCRIPTION OF EMBODIMENT

Figure 1:
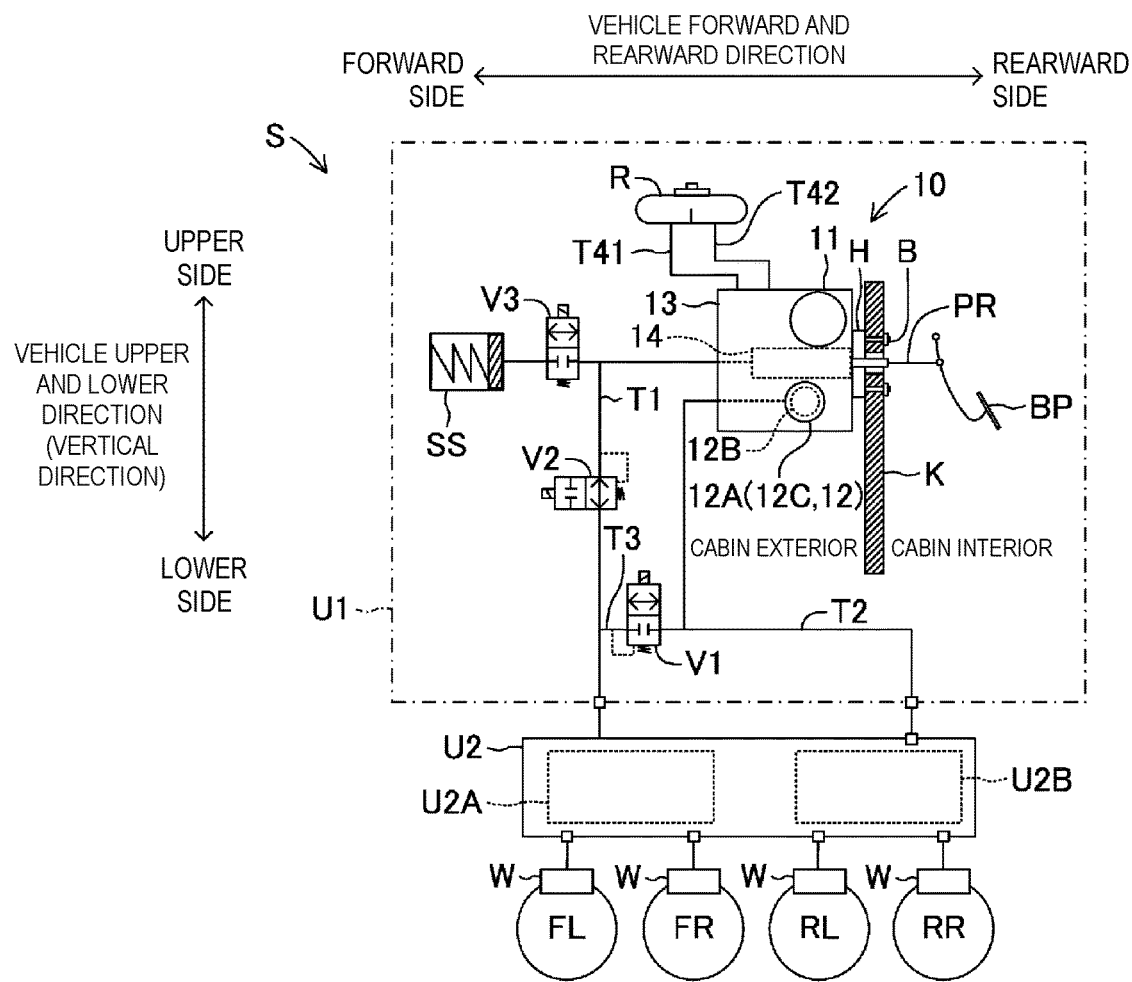
FIG. 1 is a diagram illustrating a configuration of a brake system including a brake fluid pressure supply unit according to an embodiment of the present disclosure.

An embodiment of the present disclosure will be described below with reference to the drawings. In the embodiment and modifications below, the same or equivalent parts are denoted by the same reference numerals in the figures. Each drawing used for the description is a conceptual diagram, and the shape of each part may not be strictly illustrated.

1. Overview of Brake Fluid Pressure Supply Unit 10

As illustrated in FIG. 1, a brake fluid pressure supply unit 10 for a vehicle is assembled in cabin exterior with respect to a partition K (known as a dashboard, dash panel, or dash cowl) that partitions between cabin interior of the vehicle and the cabin exterior on a forward side in a vehicle forward and rearward direction. In the cabin exterior on the forward side in the vehicle forward and rearward direction, an internal combustion engine, driving motor and inverter, fuel cell stack, and the like are disposed, or a trunk is disposed, for example.

The brake fluid pressure supply unit 10 described as an example in the present embodiment generates brake fluid pressure in accordance with the amount of driver's operation on a brake operation member such as a brake pedal BP disposed in the cabin interior, to supply brake fluid pressure to four wheel cylinders W disposed on the forward, rearward, left, and right sides of the vehicle. For this purpose, the brake fluid pressure supply unit 10 mainly includes an electric motor 11, a fluid pressure generation device 12 that is driven by the electric motor 11 to generate the brake fluid pressure, and a housing 13 in which a fluid path connected to the fluid pressure generation device 12 is formed.

With the orientation of the brake fluid pressure supply unit 10 of the present embodiment installed in the vehicle, the electric motor 11 and the fluid pressure generation device 12 are disposed on the housing 13, with the electric motor 11 being disposed more on the upper side than the fluid pressure generation device 12 in a vehicle upper and lower direction (vertical direction), as illustrated in FIG. 1. Thus, the electric motor 11 is disposed on the housing 13 while being more on the upper side than the fluid pressure generation device 12 to which fluid (such as the brake fluid, for example) is supplied, in the vehicle upper and lower direction (vertical direction).

Furthermore, in the brake fluid pressure supply unit 10 of the present embodiment, the electric motor 11 and the fluid pressure generation device 12 are disposed on the same side (for example, right or left side in a vehicle left and right direction) of the housing 13, as illustrated in FIG. 1. In other words, the electric motor 11 and the fluid pressure generation device 12 are assembled on the same surface of the housing 13. In the brake fluid pressure supply unit 10, the electric motor 11 and the fluid pressure generation device 12 are disposed on the housing 13, on the rearward side in the vehicle forward and rearward direction, that is on the backward side of the cabin exterior in the vehicle forward and backward direction and along the partition K (or close to the partition K).

The brake fluid pressure supply unit 10 of the present embodiment includes a master cylinder 14 that is accommodated in the housing 13, and is coupled to the brake pedal BP disposed on the cabin interior side and operated by the driver, through a push rod PR. The brake fluid pressure supply unit 10 does not necessarily need to include the master cylinder 14. For example, the master cylinder 14 can be omitted as appropriate, in an autonomously operable vehicle.

The brake fluid pressure supply unit 10 of the present embodiment forms a brake system S of the vehicle as illustrated in FIG. 1. The brake system S includes an upstream unit U1 including the brake fluid pressure supply unit 10 and a downstream unit U2 connected to each of the wheel cylinders W. The downstream unit U2 is, for example, an ESC actuator capable of pressurizing and depressurizing the wheel cylinders W.

The upstream unit U1 includes the brake fluid pressure supply unit 10, as well as a fluid path T1, a fluid path T2, a communication path T3, brake fluid supply paths T41 and T42, a communication control valve V1, and a master cut valve V2.

The master cylinder 14 provided in the brake fluid pressure supply unit 10 is connected to a reservoir R, and is configured to be able to mechanically supply the brake fluid pressure to the downstream unit U2 based on the amount of operation on the brake pedal BP. A stroke simulator SS and a simulator cut valve V3 are connected to the master cylinder 14. The stroke simulator SS produces reaction force (load) in response to the operation on the brake pedal BP. The simulator cut valve V3 is a normally closed electromagnetic valve. The operation of the simulator cut valve V3 is controlled by a brake control device (not illustrated).

The master cylinder 14 and a first system U2A of the downstream unit U2 are connected through the fluid path T1. The brake fluid pressure supply unit 10 and a second system U2B of the downstream unit U2 are connected through the fluid path T2. The first system U2A controls pressurization and depressurization of two of the wheel cylinders W (For example, the wheel cylinder W for a left front wheel FL and the wheel cylinder W for a right front wheel FR). The second system U2B controls pressurization and depressurization of two of the wheel cylinders W (For example, the wheel cylinder W for a right rear wheel RR and the wheel cylinder W for a left rear wheel RL). The communication path T3 connects the fluid path T1 and the fluid path T2. The brake fluid supply path T41 connects the reservoir R and the fluid pressure generation device 12 of the brake fluid pressure supply unit 10. The brake fluid supply path T42 connects the reservoir R and the master cylinder 14. The fluid pressure generation device 12 communicates with the reservoir R when a piston of the fluid pressure generation device 12 is at the initial position, and is disconnected from the reservoir R when the piston advances from the initial position by a predetermined amount. The master cylinder 14 communicates with the reservoir R when a master piston 14A is at the initial position, and no longer communicates with the reservoir R once the master piston 14A advances from the initial position by a predetermined amount. The reservoir R stores the brake fluid, and has the internal pressure maintained at atmospheric pressure.

The communication control valve V1 is a normally closed electromagnetic valve provided to the communication path T3. The communication control valve V1 switches between communicating and disconnected states of the communication path T3 based on the energized state. The master cut valve V2 is a normally open electromagnetic valve provided between a connection portion between the fluid path T1 and the communication path T3 and the master cylinder 14, in the fluid path T1. The master cut valve V2 switches between communicating and disconnected states between the master cylinder 14 and the downstream unit U2 based on the energized state.

The operation of the brake system S is controlled by the brake control device (not illustrated). Specifically, when the ignition of the vehicle is turned ON (at the time of starting in a case of electric vehicles), the brake control device switches the upstream unit U1 to a by-wire mode. Under the by-wire mode, the communication control valve V1 is open, the master cut valve V2 is closed, and the simulator cut valve V3 is open.

Thus, in the by-wire mode, the brake fluid pressure from the brake fluid pressure supply unit 10 is supplied to each of the wheel cylinders W through the first system U2A and the second system U2B of the downstream unit U2. Thus, under the by-wire mode, the brake fluid pressure supply unit 10 supplies the brake fluid pressure corresponding to target braking force, determined based on a detection value from a stroke sensor (not illustrated) that detects the stroke amount as the amount of driver's operation on the brake pedal BP The brake control device turns OFF the by-wire mode, in a case of emergency or the like. Specifically, in a case of emergency or the like, the brake control device closes the communication control valve V1, opens the master cut valve V2, and closes the simulator cut valve V3. As a result, the brake fluid pressure is supplied from the master cylinder 14 to the first system U2A of the downstream unit U2.

2. Details of Configuration of Brake Fluid Pressure Supply Unit 10

Figure 2:
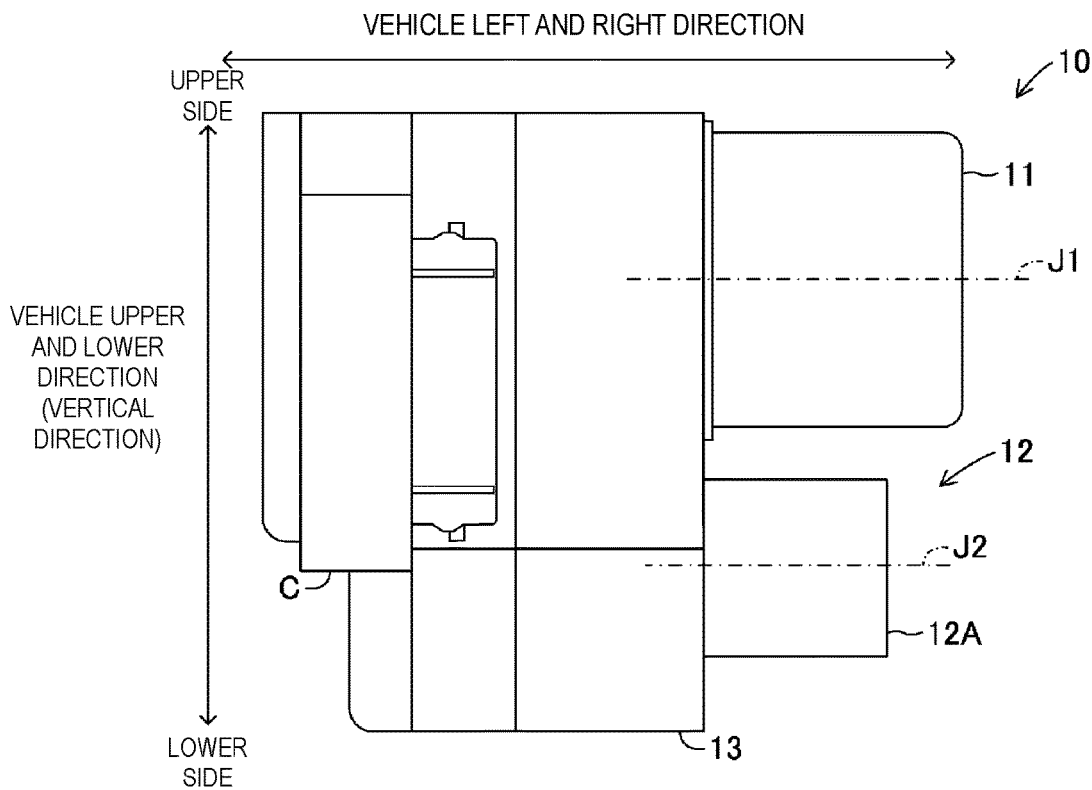
FIG. 2 is a diagram illustrating the brake fluid pressure supply unit as viewed from a forward side in a forward and rearward direction of a vehicle, with an orientation of the brake fluid pressure supply unit being installed in the vehicle.
Figure 3:
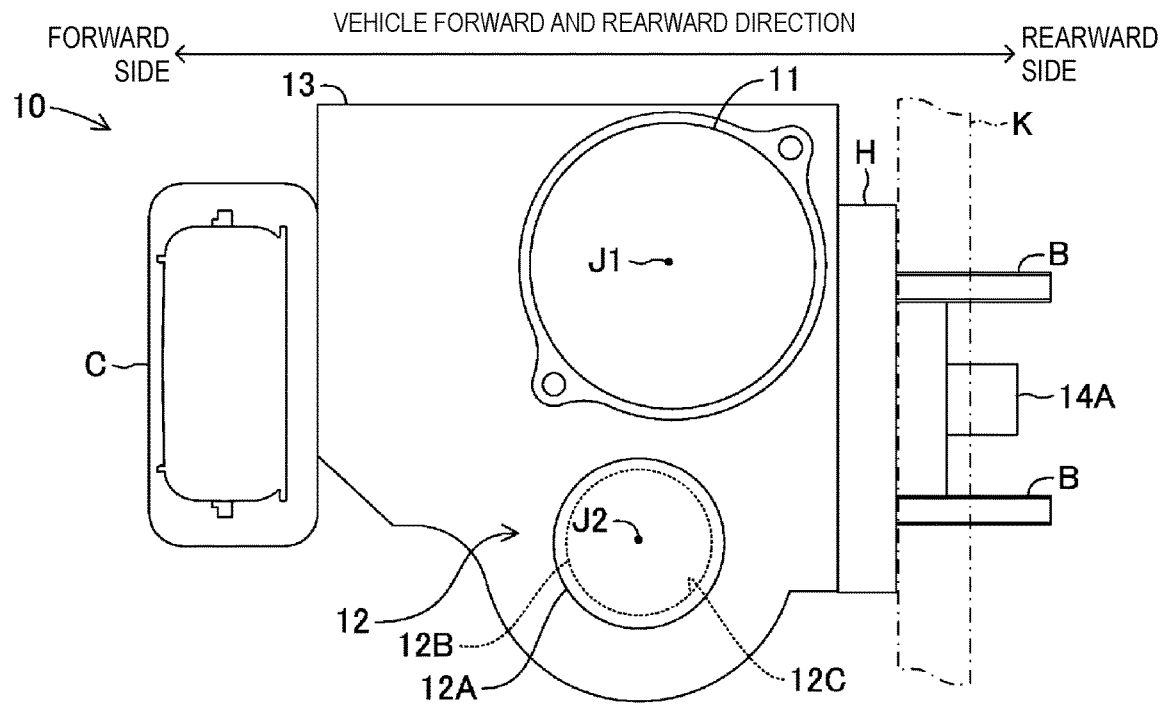
FIG. 3 is a diagram illustrating the brake fluid pressure supply unit as viewed from the side on which an electric motor and a cylinder are assembled in a left and right direction of the vehicle, with the orientation of the brake fluid pressure supply unit being installed in the vehicle.
Figure 4:
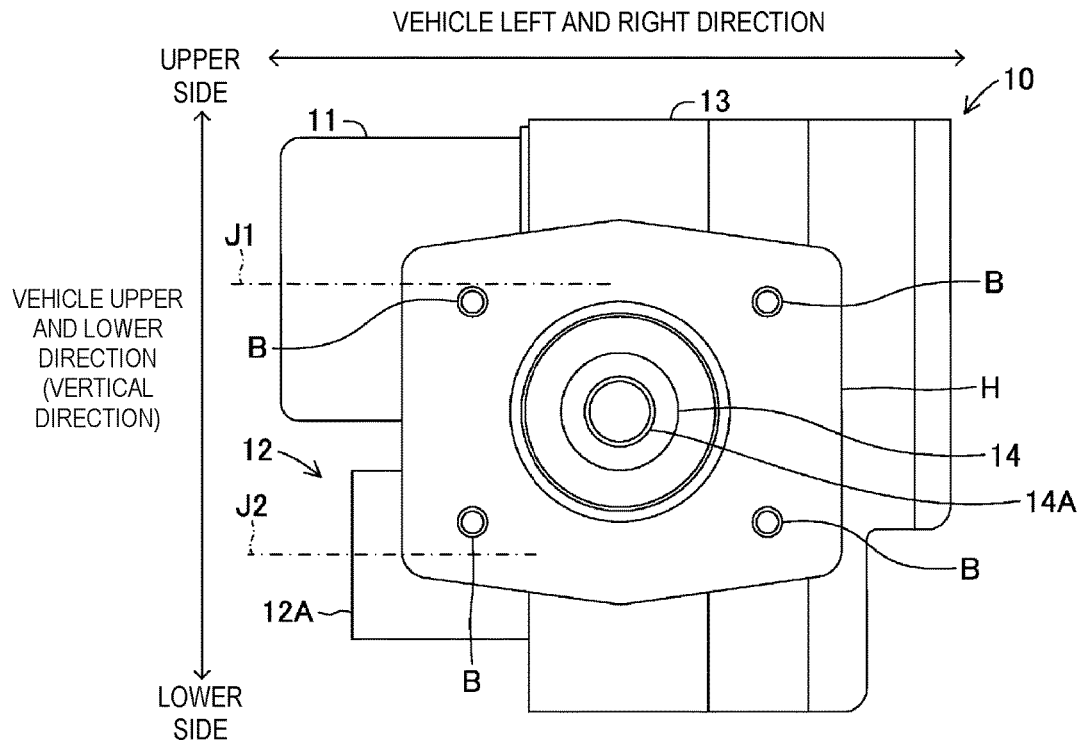
FIG. 4 is a diagram illustrating the brake fluid pressure supply unit as viewed from a rearward side in the forward and rearward direction of the vehicle, with the orientation of the brake fluid pressure supply unit being installed in the vehicle.

Next, a configuration of the brake fluid pressure supply unit 10 of the present embodiment will be described in detail. As illustrated in FIGS. 2, 3, and 4, the brake fluid pressure supply unit 10 includes the electric motor 11, the fluid pressure generation device 12, and the housing 13. The brake fluid pressure supply unit 10 of the present embodiment includes the master cylinder 14 that is accommodated in the housing 13, and is coupled to the brake pedal BP through the push rod PR, as illustrated in FIG. 4. It is a matter of course that the master cylinder 14 can be omitted, when the coupling between the brake fluid pressure supply unit 10 and the brake pedal BP is omitted, as described above.

The electric motor 11 is assembled to the housing 13 to be on the upper side in the vehicle upper and lower direction (the vertical direction, for example). The electric motor 11 generates rotational driving force and supplies the generated rotational driving force to the fluid pressure generation device 12.

As illustrated in FIG. 3, the fluid pressure generation device 12 mainly includes a cylinder 12A and a piston 12B that slides in the cylinder 12A. The cylinder 12A is assembled to the housing 13 to be more on the lower side than the electric motor 11 in the vehicle upper and lower direction (the vertical direction, for example). In the fluid pressure generation device 12, the piston 12B slides (moves) in the cylinder 12A, with a linear motion conversion mechanism (not illustrated) converting a rotational motion of a rotary shaft of the electric motor 11 into a linear motion of a linear motion portion. Thus, the fluid pressure generation device 12 generates the fluid pressure, with the piston 12B compressing the brake fluid in a fluid pressure chamber 12C formed in the cylinder 12A. The electric motor 11 and the fluid pressure generation device 12 form an electric cylinder.

In the housing 13, a fluid path connected to the fluid pressure chamber 12C of the fluid pressure generation device 12, a liquid path connected to the master cylinder 14, and the like are formed. A connector C for electrically connecting the brake fluid pressure supply unit 10 to the external is assembled to the housing 13.

As illustrated in FIGS. 3 and 4, the master cylinder 14 includes the master piston 14A coupled to the push rod PR. The master piston 14A moves in an axial direction in response to an operation on the brake pedal BP, to generate master cylinder pressure. Under the by-wire mode, the master cylinder 14 is connected to the stroke simulator SS (see FIG. 1). Thus, the driver that has operated the brake pedal BP receives reaction force. The target value of the output pressure of the fluid pressure generation device 12 may be set based on the stroke amount of the master piston 14A and the master cylinder pressure (reaction force pressure).

The brake fluid pressure supply unit 10 of the present embodiment is fixed to the partition K using a plurality of (four in the present embodiment) nuts and stud bolts B fixed to an attachment portion H for the fixing to the partition K. With the orientation with the brake fluid pressure supply unit 10 fixed to the partition K, that is, installed in the vehicle, the electric motor 11 is positioned more on the upper side than the cylinder 12A of the fluid pressure generation device 12 in the vehicle upper and lower direction (vertical direction). With this configuration, even when fluid leaks from the cylinder 12A, the fluid having leaked does not come into contact with the electric motor 11, whereby the operation of the electric motor 11 can be prevented from being impaired. Thus, sufficient reliability of the brake fluid pressure supply unit 10 can be guaranteed.

In the brake fluid pressure supply unit 10 fixed to the partition K, the electric motor 11 and the cylinder 12A of the fluid pressure generation device 12 are disposed on the same side in the housing 13, for example, the left side (one side surface) in the vehicle left and right direction as viewed from the cabin side as illustrated in FIG. 4. That is, for example, in the brake fluid pressure supply unit 10 disposed in the cabin exterior in front of the driver's seat of a right hand drive vehicle, the electric motor 11 and the cylinder 12A of the fluid pressure generation device 12 that are large in size are not disposed on the right side in the vehicle left and right direction as viewed from the cabin interior side. Thus, the brake fluid pressure supply unit 10 installed in the vehicle does not consume an installation space for installing equipment and devices, for example, a suspension device of the vehicle and the like, disposed more on the right side than the brake fluid pressure supply unit 10 in the vehicle left and right direction as viewed from the cabin side.

Furthermore, with the orientation of the brake fluid pressure supply unit 10 installed in the vehicle, the electric motor 11 and the cylinder 12A of the fluid pressure generation device 12 that are large in size are installed in a rear portion of the housing 13 in the vehicle forward and rearward direction, in the brake fluid pressure supply unit 10, as illustrated in FIG. 3. The rear portion of the housing 13 is a portion more on the rearward side of the vehicle than the center of the housing 13, with the orientation of the brake fluid pressure supply unit 10 installed in the vehicle. This expression "the electric motor 11 and the cylinder 12A are positioned in the rear portion of the housing 13 in the vehicle forward and rearward direction" means that the brake fluid pressure supply unit 10 is installed in the vehicle, with the center positions of one end portions of the electric motor 11 and the cylinder 12A protruding from the housing 13 being positioned in the rear portion of the housing 13 in the vehicle forward and rearward direction. The center position of one end portion of the electric motor 11 is an intersection between an axis J1 and an end surface of the electric motor 11 on the protruding side, as illustrated in FIGS. 2 and 3. The center position of one end portion of the cylinder 12A is an intersection between an axis J2 and an end surface of the cylinder 12A on the protruding side. With this configuration, the electric motor 11 and the cylinder 12A that are large in size are arranged on the rearward side in the vehicle forward and rearward direction, so that a provision of a space on the forward side in the vehicle can be guaranteed, whereby the safety at the time of collision of the vehicle in which the brake fluid pressure supply unit 10 is installed is improved. Furthermore, impact resistance of the electric motor 11 and the cylinder 12A can be improved against an impact from the forward side in the vehicle forward and rearward direction.

As can be understood from the description above, the brake fluid pressure supply unit 10 of the present embodiment includes: the fluid pressure generation device 12 in which the piston 12B that slides in the cylinder 12A is driven by the electric motor 11 to generate fluid pressure in the fluid pressure chamber 12C formed in the cylinder 12A; and the housing 13 in which a fluid path connected to the fluid pressure chamber 12C is formed. In the brake fluid pressure supply unit 10, the electric motor 11 and the cylinder 12A are both attached to the housing 13, and with an orientation of the brake fluid pressure supply unit 10 installed in the vehicle, the electric motor 11 is positioned more on upper side than the cylinder 12A in a vertical direction.

With this configuration, the electric motor 11 can be attached to be more on the upper side than the cylinder 12A in the vertical direction (upper side in the vehicle upper and lower direction) with the orientation of the brake fluid pressure supply unit 10 installed in the vehicle. Thus, even if the brake fluid leaks from the cylinder 12A, the brake fluid having leaked can be prevented from entering the inside of the electric motor 11. Thus, the operation of the electric motor 11 is not impaired, whereby the reliability of the brake fluid pressure supply unit 10 can be improved.

Furthermore, in the brake fluid pressure supply unit 10 of the present embodiment, the electric motor 11 and the cylinder 12A of the fluid pressure generation device 12 that are heavy can be disposed close to the attachment portion H, that is, the partition K. Thus, the vibration of the brake fluid pressure supply unit 10 as a whole due to vibration caused by the operation of the electric motor 11 can be suppressed, for example.

The vehicle according to the present embodiment includes the brake fluid pressure supply unit 10 in which the electric motor 11 and the cylinder 12A are disposed on same side of the housing 13, wherein the brake fluid pressure supply unit 10 is installed with the electric motor 11 and the cylinder 12A being positioned in the rear portion of the housing 13 in the forward and rearward direction of the vehicle.

With this configuration, in a state where the brake fluid pressure supply unit is installed in the vehicle, the electric motor 11 and the cylinder 12A can be positioned on the rearward side in the vehicle forward and rearward direction, or can be more on the rearward side than the center in the vehicle forward and rearward direction. With this configuration, the electric motor 11 and the cylinder 12A that are large in size are arranged on the rearward side in the vehicle forward and rearward direction, so that a provision of a space on the forward side in the vehicle can be guaranteed, whereby the safety at the time of collision of the vehicle in which the brake fluid pressure supply unit 10 is installed is improved. Furthermore, impact resistance of the electric motor 11 and the cylinder 12A can be improved against an impact from the forward side in the vehicle forward and rearward direction.

3. Modification

In the brake fluid pressure supply unit 10 of the embodiment described above, the electric motor 11 and the cylinder 12A of the fluid pressure generation device 12 are disposed on the same side of the housing 13, with the former being more on the upper side than the latter in the vehicle upper and lower direction (vertical direction). However, when the electric motor 11 and the cylinder 12A of the fluid pressure generation device 12 are disposed on the same side of the housing 13, the disposition of the electric motor 11 and the cylinder 12A of the fluid pressure generation device 12 in the vehicle upper and lower direction is not limited.

Figure 5:
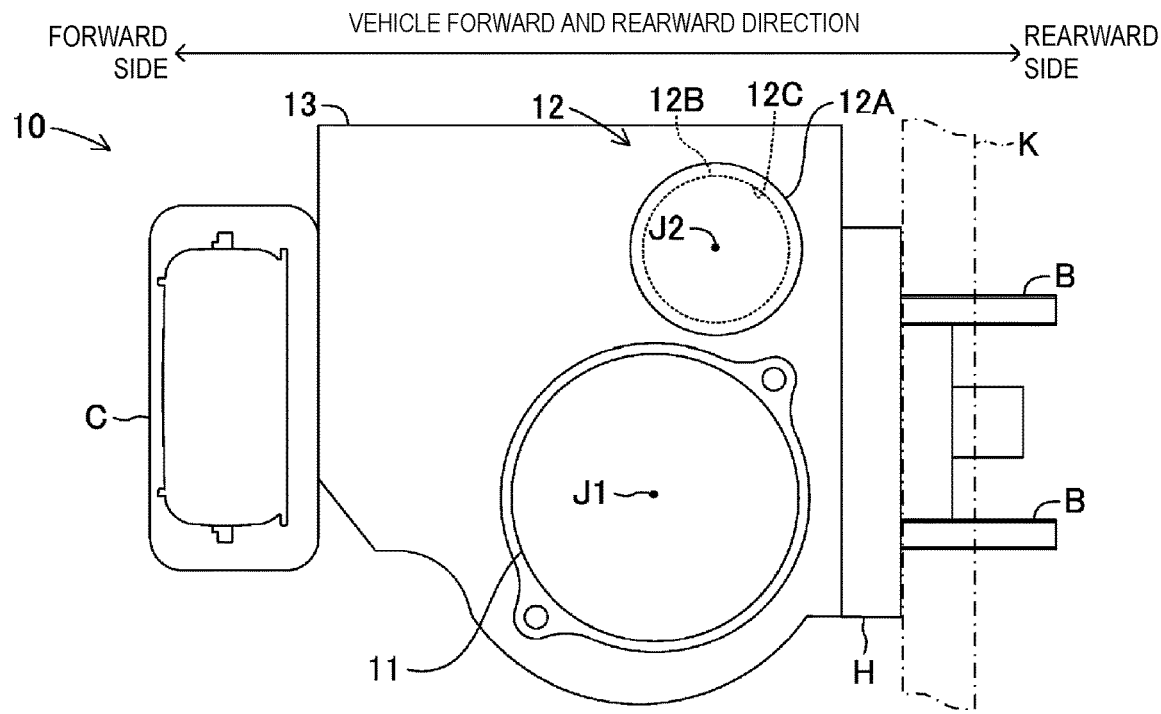
FIG. 5 is a diagram illustrating a brake fluid pressure supply unit according to a modification of the embodiment as viewed from the side on which the electric motor and the cylinder are assembled in a left and right direction of a vehicle, with an orientation of the brake fluid pressure supply unit being installed in the vehicle.

For example, when the electric motor 11 and the cylinder 12A of the fluid pressure generation device 12 are positioned in the rear portion of the housing 13 in the vehicle forward and rearward direction on the same side of the housing 13, the cylinder 12A may be disposed more on the upper side than the electric motor 11 in the vehicle upper and lower direction (vertical direction), as illustrated in FIG. 5. Technical ideas that can be recognized from the above embodiment and modification will be added below.

A vehicle includes the brake fluid pressure supply unit 10 including: the fluid pressure generation device 12 in which the piston 12B that slides in the cylinder 12A is driven by the electric motor 11 to generate fluid pressure in the fluid pressure chamber 12C formed in the cylinder 12A; and the housing 13 in which a fluid path connected to the fluid pressure chamber 12C is formed, the electric motor 11 and the cylinder 12A being arranged side by side on the same side of the housing 13, wherein the brake fluid pressure supply unit 10 is installed with the electric motor 11 and the cylinder 12A positioned in the rear portion of the housing 13 in the forward and rearward direction of the vehicle.

Also with this configuration, the electric motor 11 and the cylinder 12A that are large in size are disposed on the rearward side in the vehicle forward and rearward direction, so that a space can be surely provided on the forward side in the vehicle, whereby the safety at the time of collision of the vehicle in which the brake fluid pressure supply unit 10 is installed is improved. Coaxial arrangement of the rotary shaft of the electric motor 11 and the axis of the cylinder 12A (the long axis of the fluid pressure generation device 12), that is, serial arrangement of the electric motor 11 and the fluid pressure generation device 12 leads to a long portion protruding from the housing 13. As a result, installation in the vehicle may become difficult. On the other hand, in the brake fluid pressure supply unit 10, the rotary shaft of the electric motor 11 and the long axis of the fluid pressure generation device 12 (axis of the cylinder 12A) are arranged in parallel, that is, the electric motor 11 and the cylinder 12A of the fluid pressure generation device 12 are arranged side by side in the vehicle upper and lower direction (vertical direction) on the same side of the housing 13. Thus, the portion protruding from the housing 13 can be made relatively short. As a result, space saving as well as easy installation in the vehicle can be achieved as in the embodiment described above.

4. Another Modification

In the embodiment described above, the electric motor 11 and the fluid pressure generation device 12 are disposed on the same side of the housing 13. The disposition of the electric motor 11 and the fluid pressure generation device 12 with respect to the housing 13 is not limited to the disposition on the same side of the housing 13. For example, the electric motor 11 and the fluid pressure generation device 12 may be disposed to sandwich the housing 13 without being coaxially arranged. Also in this case, the brake fluid pressure supply unit 10 can be downsized, with the electric motor 11 and the fluid pressure generation device 12 arranged to partially overlap with the housing 13 provided in between, for example.

The invention claimed is:

1. A vehicle comprising:
a brake fluid pressure supply unit comprising:

a fluid pressure generation device in which a piston that slides in a cylinder is driven by an electric motor to generate fluid pressure in a fluid pressure chamber formed in the cylinder; and a housing in which a fluid path connected to the fluid pressure chamber is formed, wherein the electric motor and the cylinder are both attached to the housing, with an orientation of the brake fluid pressure supply unit installed in the vehicle, the electric motor is positioned more on an upper side than the cylinder in a vertical direction, the electric motor and the cylinder are disposed on same side of the housing, and the brake fluid pressure supply unit is installed with the electric motor and the cylinder being positioned in a rear portion of the housing in a forward and rearward direction of the vehicle.

* * * * *